United States Patent
Matsumoto et al.

(10) Patent No.: US 9,384,771 B2
(45) Date of Patent: Jul. 5, 2016

(54) LUBRICANTS PROVIDING MAGNETIC HEAD WEAR REDUCTION AND MAGNETIC SPACING IMPROVEMENT

(71) Applicant: HGST Netherlands B.V., Amsterdam (NL)

(72) Inventors: Hiroyuki Matsumoto, Chigasaki (JP); Yoshihiko Ooeda, Yokohama (JP); Sukefumi Ito, Odawara (JP); Yoko Saito, Ishioka (JP)

(73) Assignee: HGST Netherlands B.V., Amsterdam (NL)

( * ) Notice: Subject to any disclaimer, the term of this patent is extended or adjusted under 35 U.S.C. 154(b) by 35 days.

(21) Appl. No.: 14/137,878

(22) Filed: Dec. 20, 2013

(65) Prior Publication Data

US 2015/0179203 A1 Jun. 25, 2015

(51) Int. Cl.
*G11B 5/66* (2006.01)
*G11B 5/725* (2006.01)

(52) U.S. Cl.
CPC ..................................... *G11B 5/725* (2013.01)

(58) Field of Classification Search
None
See application file for complete search history.

(56) References Cited

U.S. PATENT DOCUMENTS

| | | | |
|---|---|---|---|
| 6,548,140 B1 | 4/2003 | Gui et al. | |
| 6,730,403 B1 * | 5/2004 | Shirai et al. | 428/833.5 |
| 7,833,641 B2 | 11/2010 | Tomiyasu et al. | |
| 8,586,703 B2 | 11/2013 | Yang et al. | |
| 2009/0291325 A1 | 11/2009 | Xu et al. | |
| 2010/0035083 A1 | 2/2010 | Yang et al. | |
| 2012/0251843 A1 * | 10/2012 | Yan et al. | 428/800 |
| 2012/0276417 A1 | 11/2012 | Shimokawa et al. | |
| 2013/0288080 A1 * | 10/2013 | Yan et al. | 428/833 |

FOREIGN PATENT DOCUMENTS

| | | |
|---|---|---|
| JP | 2000260017 | 9/2000 |
| JP | 2007193924 | 8/2007 |
| JP | 2009542805 | 12/2009 |
| JP | 2010006810 | 1/2010 |
| JP | 2010037563 | 2/2010 |
| JP | 2011021165 | 2/2011 |
| JP | 4654339 | 3/2011 |

\* cited by examiner

*Primary Examiner* — Holly Rickman
(74) *Attorney, Agent, or Firm* — Zilka-Kotab, PC

(57) ABSTRACT

A lubricant according to one embodiment includes a cyclophosphazene according to chemical formula 1,

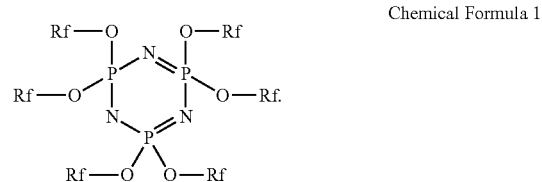

Chemical Formula 1

15 Claims, 8 Drawing Sheets

Chemical Formula 1

Chemical Formula 2

Chemical Formula 3

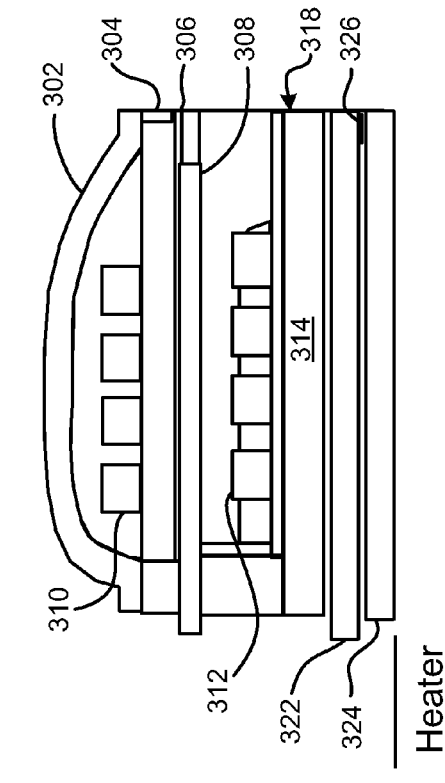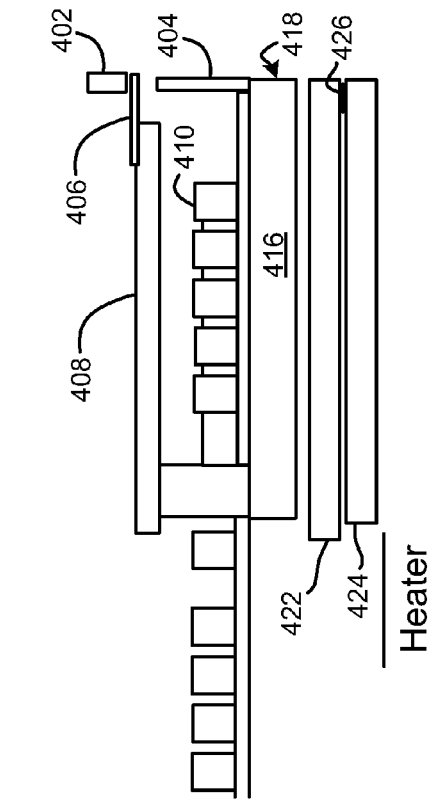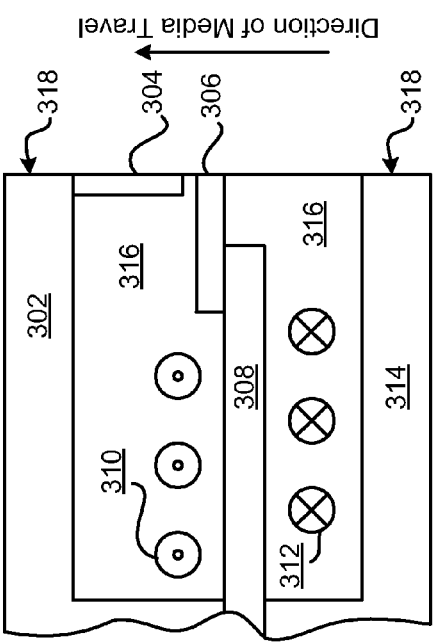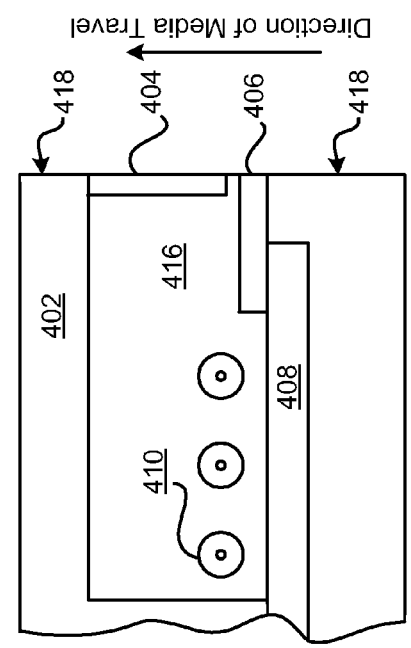

900

Form a magnetic recording layer above a non-magnetic substrate — 902

Form a protective overcoat above the magnetic recording layer — 904

Form a lubricant film above the protective overcoat, wherein the lubricant film comprises a cyclophosphazene according to chemical formula 1, wherein each terminal functional group (Rf) of the cyclophosphazene is selected from a group consisting of: a first perfluoropolyether, Rf(A), according to chemical formula 2 and a second perfluoropolyether, Rf(B), according to chemical formula 3, wherein n and m are parameters indicating an average number of repeating chains of ($CF_2CF_2CF_2O$), wherein one or more of the terminal functional groups (Rf) of the cyclophosphazene are Rf(B) to provide wear protection, and wherein x is in a range from 0 to about 2 — 906

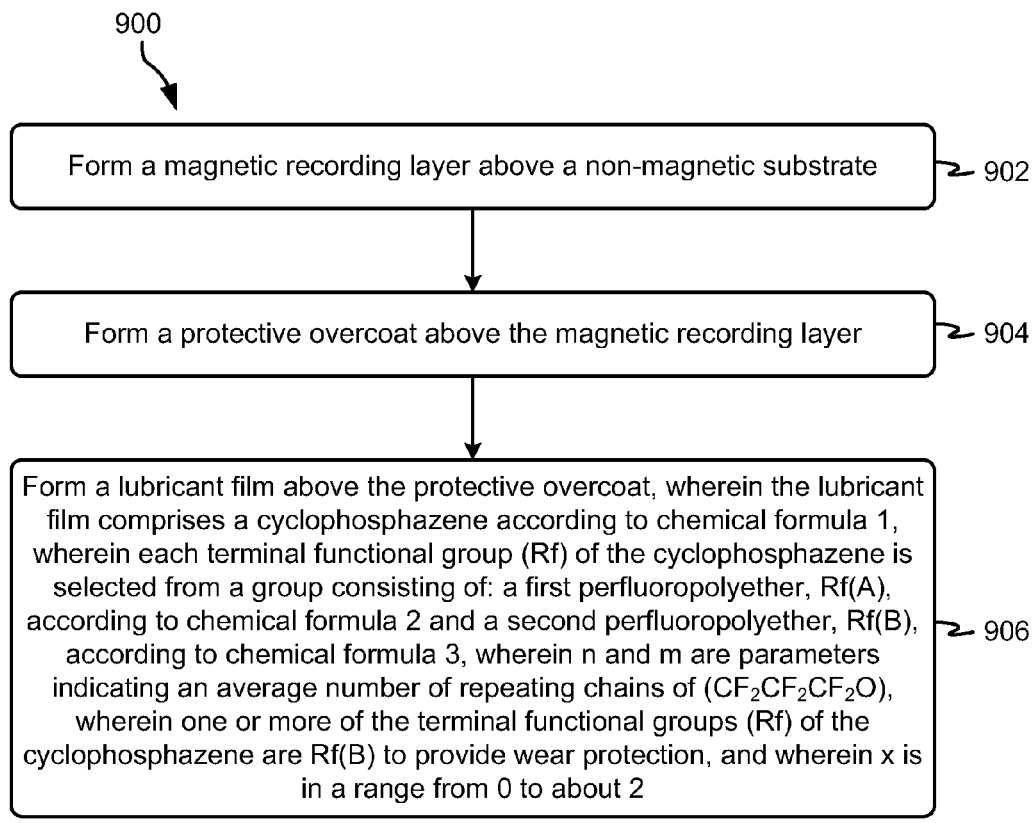

Chemical Formula 1

$-CH_2CF_2CF_2O(CF_2CF_2CF_2O)_nCF_2CF_2CH_2O\left[CH_2CHCH_2O\right]_x H$
                                                            $|$
                                                            $OH$ Chemical Formula 2

$-CH_2CF_2CF_2O(CF_2CF_2CF_2O)_mCF_2CF_2CF_3$

Chemical Formula 3

FIG. 9

LUBRICANTS PROVIDING MAGNETIC HEAD WEAR REDUCTION AND MAGNETIC SPACING IMPROVEMENT

FIELD OF THE INVENTION

The present invention relates to lubricants, and more particularly, this invention relates to lubricants that provide for reduction in magnetic head wear and improvement in magnetic spacing.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components. This reduction in component size is aided by the ability to maintain the reading and writing elements in a magnetic head in a position closer to the magnetic recording layer of the magnetic medium. This distance between the reading and writing elements and the magnetic recording layer is referred to as the magnetic spacing.

Narrowing the magnetic spacing is a very effective method for improving the recording density of a magnetic recording device, such as a HDD. Reducing the clearance, which is defined as the gap between the lowest point (farthest protruding portion at the ABS) of the magnetic head and the uppermost surface of the magnetic medium has been attempted to reduce the magnetic spacing. A technique used in magnetic recording devices to reduce this clearance relies on thermal expansion of one or more portions of the magnetic head. This thermal expansion is caused by a heater which is positioned near one or more elements of the magnetic head such that applying current to this heater controls the expansion of the one or more portions of the magnetic head to provide a smaller head-to-medium clearance.

Another approach aimed at narrowing the magnetic spacing on the magnetic medium relies on thinning of one or more layers above the magnetic recording layer. Some layers which may be made thinner include the protective film and the lubricant film. However, this approach exposes sensitive components in the magnetic head to wear-induced fatigue and failure, due to the reduction in protection immediately above the sensitive components that the protective film and lubricant film provide. Accordingly, it would be beneficial to achieve smaller magnetic clearance without introducing increased wear to the magnetic head.

SUMMARY

A lubricant according to one embodiment includes a cyclophosphazene according to chemical formula 1,

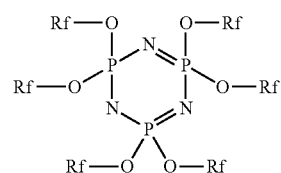

Chemical Formula 1 where each terminal functional group (Rf) of the cyclophosphazene is selected from a group consisting of: a first perfluoropolyether, Rf(A), according to chemical formula 2 and a second perfluoropolyether, Rf(B), according to chemical formula 3,

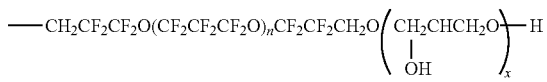

Chemical Formula 2

Chemical Formula 3 where n and m are parameters indicating an average number of repeating chains of $(CF_2CF_2CF_2O)$. One or more of the terminal functional groups (Rf) of the cyclophosphazene are Rf(B) to provide wear protection, and x is in a range from 0 to about 2.

A magnetic medium according to one embodiment includes a magnetic recording layer positioned above a non-magnetic substrate, a protective overcoat positioned above the magnetic recording layer, and the lubricant as recited above positioned above the protective overcoat.

A method for forming a magnetic medium according to one embodiment includes forming a magnetic recording layer above a non-magnetic substrate; forming a protective overcoat above the magnetic recording layer; and forming a lubricant film above the protective overcoat. The lubricant film comprises a cyclophosphazene according to chemical formula 1,

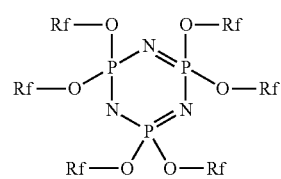

Chemical Formula 1 where each terminal functional group (Rf) of the cyclophosphazene is selected from a group consisting of: a first perfluoropolyether, Rf(A), according to chemical formula 2 and a second perfluoropolyether, Rf(B), according to chemical formula 3,

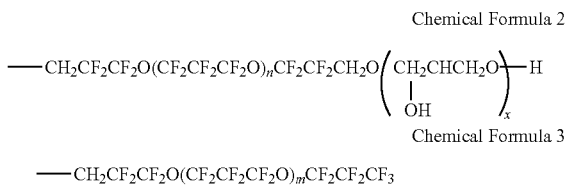

Chemical Formula 2

—CH$_2$CF$_2$CF$_2$O(CF$_2$CF$_2$CF$_2$O)$_n$CF$_2$CF$_2$CH$_2$O$\left(\begin{array}{c}\text{CH}_2\text{CHCH}_2\text{O}\\|\\ \text{OH}\end{array}\right)_x$H Chemical Formula 3

—CH$_2$CF$_2$CF$_2$O(CF$_2$CF$_2$CF$_2$O)$_m$CF$_2$CF$_2$CF$_3$ where n and m are parameters indicating an average number of repeating chains of (CF$_2$CF$_2$CF$_2$O), one or more of the terminal functional groups (Rf) of the cyclophosphazene are Rf(B) to provide wear protection, and x is in a range from 0 to about 2.

A magnetic medium according to another embodiment includes a magnetic recording layer; and a lubricant film positioned above the magnetic recording layer. The lubricant film comprises a cyclophosphazene according to chemical formula 1,

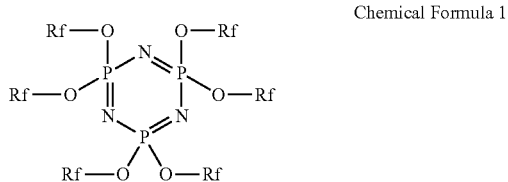

Chemical Formula 1 where each terminal functional group (Rf) of the cyclophosphazene is selected from a group consisting of: a first perfluoropolyether, Rf(A), according to chemical formula 2 and a second perfluoropolyether, Rf(B), according to chemical formula 3,

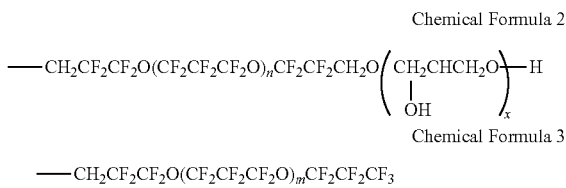

Chemical Formula 2

—CH$_2$CF$_2$CF$_2$O(CF$_2$CF$_2$CF$_2$O)$_n$CF$_2$CF$_2$CH$_2$O$\left(\begin{array}{c}\text{CH}_2\text{CHCH}_2\text{O}\\|\\ \text{OH}\end{array}\right)_x$H Chemical Formula 3

—CH$_2$CF$_2$CF$_2$O(CF$_2$CF$_2$CF$_2$O)$_m$CF$_2$CF$_2$CF$_3$ where n and m are parameters indicating an average number of repeating chains of (CF$_2$CF$_2$CF$_2$O) and are in a range from about 4 to about 8, one or more of the terminal functional groups (Rf) of the cyclophosphazene are Rf(B) to provide wear protection, and x is in a range from 0 to about 2.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils. FIG. 1 shows a T-mode spin torque oscillator (STO) structure, according to the prior art.

FIG. 9 shows a flowchart of a method for forming a magnetic medium, according to one embodiment.

DETAILED DESCRIPTION

Figure 1:
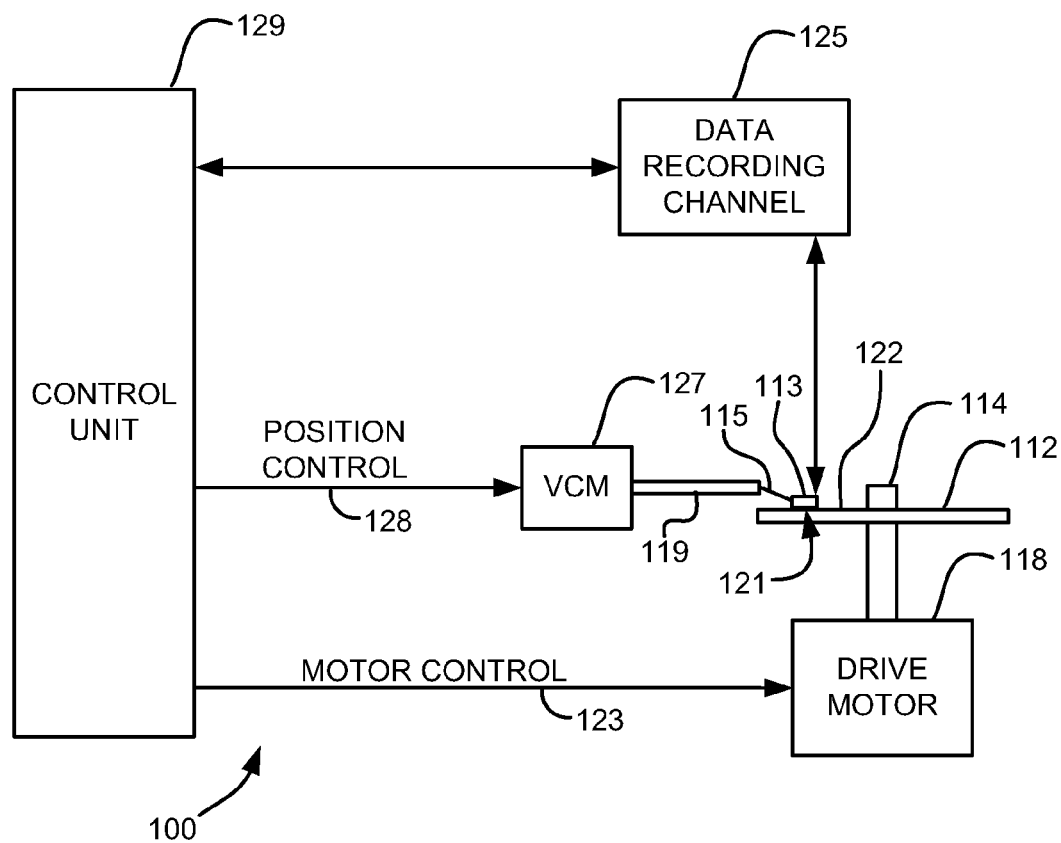
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of lubricants and disk-based storage systems and/or related systems and methods that utilize the lubricants, as well as operation and/or component parts thereof.

In one general embodiment, a lubricant includes a cyclophosphazene according to chemical formula 1, Chemical Formula 1

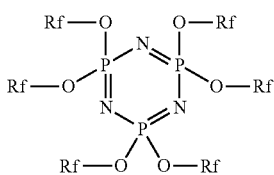

where each terminal functional group (Rf) of the cyclophosphazene is selected from a group consisting of: a first perfluoropolyether, Rf(A), according to chemical formula 2 and a second perfluoropolyether, Rf(B), according to chemical formula 3, Chemical Formula 2

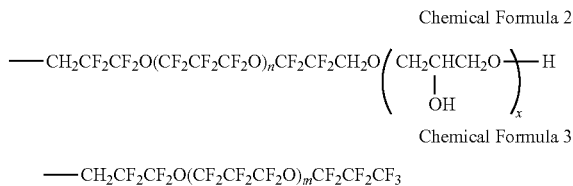

Chemical Formula 3

—$CH_2CF_2CF_2O(CF_2CF_2CF_2O)_mCF_2CF_2CF_3$ where n and m are parameters indicating an average number of repeating chains of ($CF_2CF_2CF_2O$). One or more of the terminal functional groups (Rf) of the cyclophosphazene are Rf(B) to provide wear protection, and x is in a range from 0 to about 2.

In one general embodiment, a magnetic medium includes a magnetic recording layer positioned above a non-magnetic substrate, a protective overcoat positioned above the magnetic recording layer, and the lubricant as recited above positioned above the protective overcoat.

In another general embodiment, a method for forming a magnetic medium includes forming a magnetic recording layer above a non-magnetic substrate; forming a protective overcoat above the magnetic recording layer; and forming a lubricant film above the protective overcoat. The lubricant film comprises a cyclophosphazene according to chemical formula 1, Chemical Formula 1

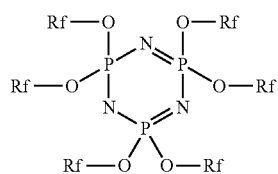

where each terminal functional group (Rf) of the cyclophosphazene is selected from a group consisting of: a first perfluoropolyether, Rf(A), according to chemical formula 2 and a second perfluoropolyether, Rf(B), according to chemical formula 3, Chemical Formula 2

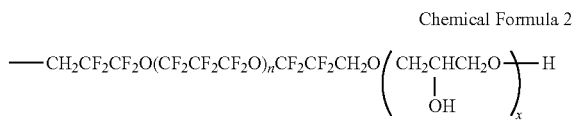

Chemical Formula 3

—$CH_2CF_2CF_2O(CF_2CF_2CF_2O)_mCF_2CF_2CF_3$ where n and m are parameters indicating an average number of repeating chains of ($CF_2CF_2CF_2O$), one or more of the terminal functional groups (Rf) of the cyclophosphazene are Rf(B) to provide wear protection, and x is in a range from 0 to about 2.

In yet another general embodiment, a magnetic medium includes a magnetic recording layer; and a lubricant film positioned above the magnetic recording layer. The lubricant film comprises a cyclophosphazene according to chemical formula 1, Chemical Formula 1

where each terminal functional group (Rf) of the cyclophosphazene is selected from a group consisting of: a first perfluoropolyether, Rf(A), according to chemical formula 2 and a second perfluoropolyether, Rf(B), according to chemical formula 3, Chemical Formula 2

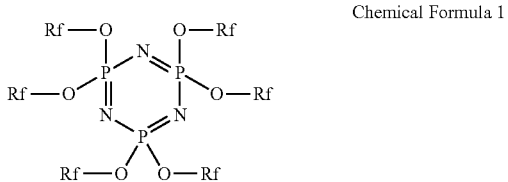

Chemical Formula 3

—$CH_2CF_2CF_2O(CF_2CF_2CF_2O)_mCF_2CF_2CF_3$ where n and m are parameters indicating an average number of repeating chains of ($CF_2CF_2CF_2O$) and are in a range from about 4 to about 8, one or more of the terminal functional groups (Rf) of the cyclophosphazene are Rf(B) to provide wear protection, and x is in a range from 0 to about 2.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figures 2A, 2C, 2E:
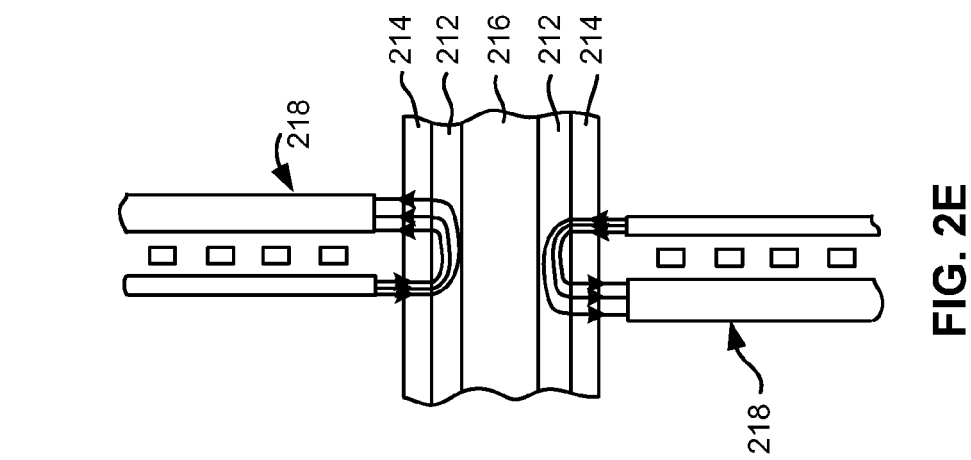
FIG. 2A is a schematic representation in section of a recording medium utilizing a longitudinal recording format.
FIG. 2C is a magnetic recording medium utilizing a perpendicular recording format.
FIG. 2E is a schematic representation of a recording apparatus adapted for recording separately on both sides of the medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
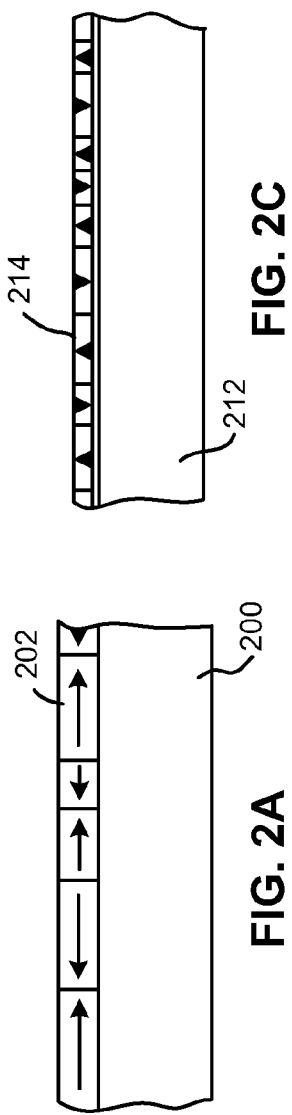
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
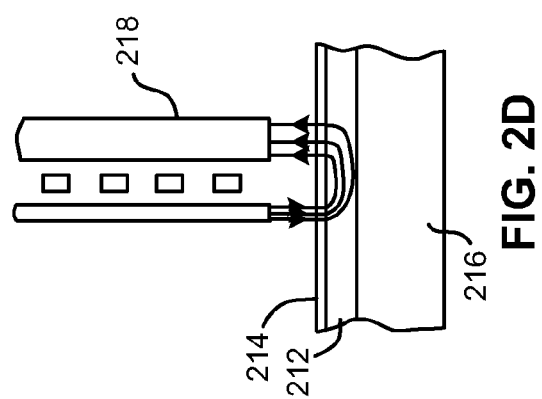
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Except as otherwise described herein, the various components of the structures of FIGS. 3A-4B may be of conventional materials and design, as would be understood by one skilled in the art.

Any of the magnetic head structures and/or designs described in FIGS. 2A-4B may be used in conjunction with the embodiments and/or approaches described herein in various combinations. In addition, although not explicitly shown, any of the magnetic heads previously described may include, once configured for use in a magnetic recording system, such as a HDD, a protective film and/or a lubricant film provided on an ABS-side of the magnetic head.

Derivatives of FOMBLIN Z™, which is a perfluoropolyether (PFPE) lubricant made by Solvay Solexis, or the like, have been used as lubricants in the lubricant film. Lubricant films have become as thin as 1-2 molecules in thickness, but even at these sparse molecular thicknesses, there is still a need to further reduce the bulk height of the molecule, which is increased by the skeleton of the main chain of the lubricant molecule adsorbed onto the protective film becoming a random coil in order to reduce the overall thickness of the lubricant film.

Narrowing the clearance between the magnetic head and the magnetic medium surface risks causing the lubricant on the magnetic medium to transfer to the magnetic head side, which obstructs the floating stability of the magnetic head and causes great fluctuations in the magnetic spacing. Therefore, the lubricant should adequately adsorb to the disk. As disclosed, for example, in U.S. Pat. No. 6,548,140, lubricants with various molecular structures have been proposed as lubricants which have several hydroxyls per molecule and minimize the height per molecule so as to have high adsorption to a disk. Japanese Patent No. 4,654,339, for example, has also described lubricants having a characteristic phosphazene ring structure.

Although reducing clearance has become more common; however, a desired goal of using a lubricant, namely reducing wear on the magnetic head side, has been hampered by the efforts to reduce the clearance due to thinning of the lubricant film. This is because as the thickness of the lubricating layer is made thinner to allow for more clearance, the protection afforded by the lubricant film is also reduced.

Furthermore, a technique may be used for bringing the reading and writing element(s) closer to the magnetic recording layer of the magnetic medium using a heater housed in the magnetic head that narrows the clearance and thereby allows improvements in recording density. Narrowing the clearance, however, increases the frequency of contact between the reading and writing element(s) and the magnetic medium, and makes wear of the protective film forming an ABS on the magnetic head side, and by extension the reading and writing element(s), more common and pronounced. Thinning the lubricant film on the magnetic medium accelerates this process.

Narrowing the clearance also causes the lubricant on the magnetic medium to transfer in greater amounts to the magnetic head side, thereby resulting in greater fluctuations in clearance. Therefore, no lubricant has been discovered which addresses the problems associated with both wear and lubricant transfer.

Although making the lubricant of the magnetic medium thinner to improve recording density may seem desirable, making the lubricant thin causes the ABS protective film of the magnetic head more prone to wear.

Figure 5:
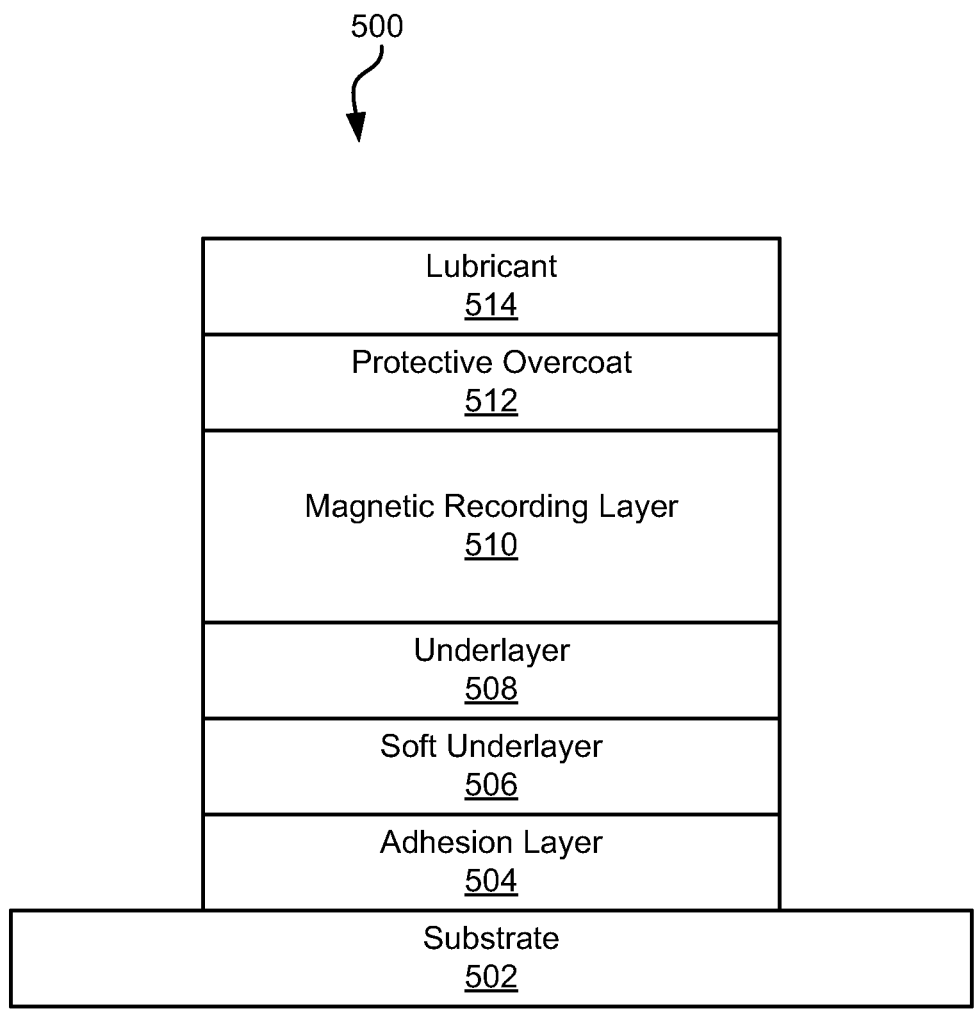
FIG. 5 is a simplified schematic diagram of a magnetic medium according to one embodiment.

Now referring to FIG. 5, a lubricant film 514 is shown above an upper surface of a magnetic medium 500, according to one embodiment. The magnetic medium 500 may be any type of magnetic media known in the art, such as a hard disk, a magnetic tape, an optical disk, etc. The magnetic medium 500 may include a magnetic recording layer 510 and, in some approaches, a protective overcoat 512 positioned above the magnetic recording layer 510. The magnetic recording layer 510 and the protective overcoat 512 are formed above a nonmagnetic substrate 502, such as a glass substrate or some other suitable material known in the art. The upper surface of the magnetic medium 500 may be coated with a lubricant in a lubricant film 514.

In one embodiment, the lubricant film 514 may comprise a perfluoropolyether (as shown in Chemical Formula 3, below, according to one embodiment) having a cyclophosphazene (as shown in Chemical Formula 1, below, according to one embodiment) positioned in a center of the perfluoropolyether molecule. The cyclophosphazene does not have at least one terminal functional group among the phosphorus therein, and a perfluoropolyether (as shown in Chemical Formula 2, below, according to one embodiment) having at least one hydroxyl as a terminal functional group.

Chemical Formula 1

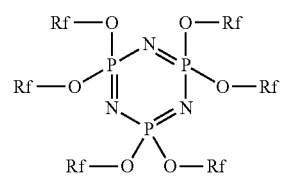

In the cyclophosphazene shown in Chemical Formula 1, above, two different Rf groups, Rf(A) and Rf(B), may be attached to the oxygen groups. Chemical Formula 2 shows the chemical formula for Rf(A) according to one embodiment, while Chemical Formula 3 shows the chemical formula and Rf(B), according to one embodiment.

Chemical Formula 2

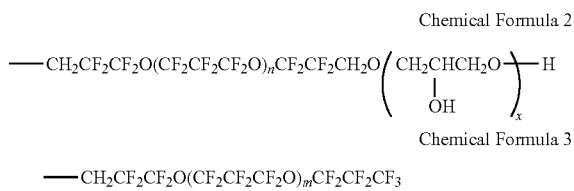

Chemical Formula 3

—CH$_2$CF$_2$CF$_2$O(CF$_2$CF$_2$CF$_2$O)$_m$CF$_2$CF$_2$CF$_3$

In Chemical Formula 2, n is a parameter which indicates a number of repeating chains of (CF$_2$CF$_2$CF$_2$O), while x is a parameter indicating a number of repeating chains of [CH$_2$C (OH)HCH$_2$O]. In one embodiment, n may be between about 4 and about 8 on average to reduce the height of the molecule, while x may be in a range between 0 and about 5 on average, such as 0, 1, 2, etc. In one embodiment, x may be 1.

In Chemical Formula 3, m is a parameter which indicates a number of repeating chains of (CF$_2$CF$_2$CF$_2$O). In one embodiment, m may be in a range from about 4 to about 8, on average to reduce the height of the molecule.

Many different arrangements are possible for the Rf groups, ranging from all Rf groups being Rf(A), a mix of Rf(A) and Rf(B) groups, to all Rf groups being Rf(B), according to various embodiments. In other words, of the six Rf groups (6·Rf), the selection of which type of Rf group may be determined according to Equation 1.

$$6 \cdot Rf = a \cdot Rf(A) + b \cdot Rf(B) \quad \text{Equation 1}$$

In Equation 1, a is the number of Rf(A) groups and b is the number of Rf(B) groups, with a≤6, b≤6, and a+b=6. In some embodiments, a may be in a range from about 2 to about 5, and b may be in a range from about 1 to about 4. In a more specific embodiment, a may be in a range from about 2 to about 3. When a is less than 2, adsorption to the protective film on the magnetic medium is reduced. However, when a is greater than 3, the portion of the molecule that ameliorates head-disk contact is reduced and wear on the media-facing surface, such as the ABS, is increased.

Although the values a, b, n, m, and x in the Chemical Formulae 1-3 and Equation 1 are integers, these parameters represent averages, as the lubricant molecules are present in a distributed state.

Using a lubricant according to any of the embodiments described herein may improve adhesion to the magnetic medium (e.g., magnetic disk) via the hydroxyl in Chemical Formula 2. Also, the lubricant may be expected to have an effect of ameliorating contact force in one molecule of the lubricant of Chemical Formula 1 due to the portion which adheres to Chemical Formula 3. Furthermore, the lubricant may prevent transfer of the lubricant to the magnetic head and wear of the media-facing surface (e.g., ABS) of the magnetic head. Moreover, the molecular length of Chemical Formulae 2 and 3 also reduces the height of each molecule, and as a result, contributes to narrowing the clearance.

Referring again to FIG. 5, in an example, a lubricant film 514 having a molecular structure represented by Chemical Formula 1 in which a=3.5, n=6.2, m=5.8, and x=1 was coated on a magnetic medium 500 (e.g., a magnetic disk) to a film thickness of about 8 Å. The magnetic medium 500 on which the lubricant film 514 was coated and/or formed comprised a non-magnetic substrate 502 (e.g., a glass substrate), an adhesion layer 504 positioned above the substrate 502 configured to promote coupling of layers formed thereabove, a soft underlayer 506 positioned above the adhesion layer 504 to promote data recording in the magnetic recording layer 510, an underlayer 508 positioned above the soft underlayer 506 for promoting formation of the magnetic recording layer 510 with good magnetic properties, the magnetic recording layer 510 positioned above the underlayer 508 configured to record data therein, and a protective overcoat 512 positioned above the magnetic recording layer 510 configured to provide protection to the magnetic recording layer from wear, corrosion, etc. Of course, more or less layers than those specifcally described above may be included in the magnetic medium 500 according to various embodiments.

In one study, molecular dynamic simulation of the mode of adhesion of a lubricant of Chemical Formula 4, below, on a protective film was researched.

Chemical Formula 4

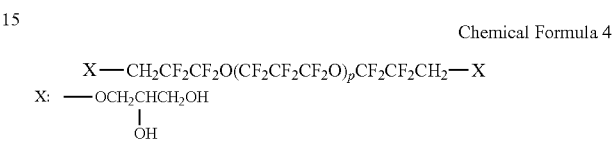

Figure 6:
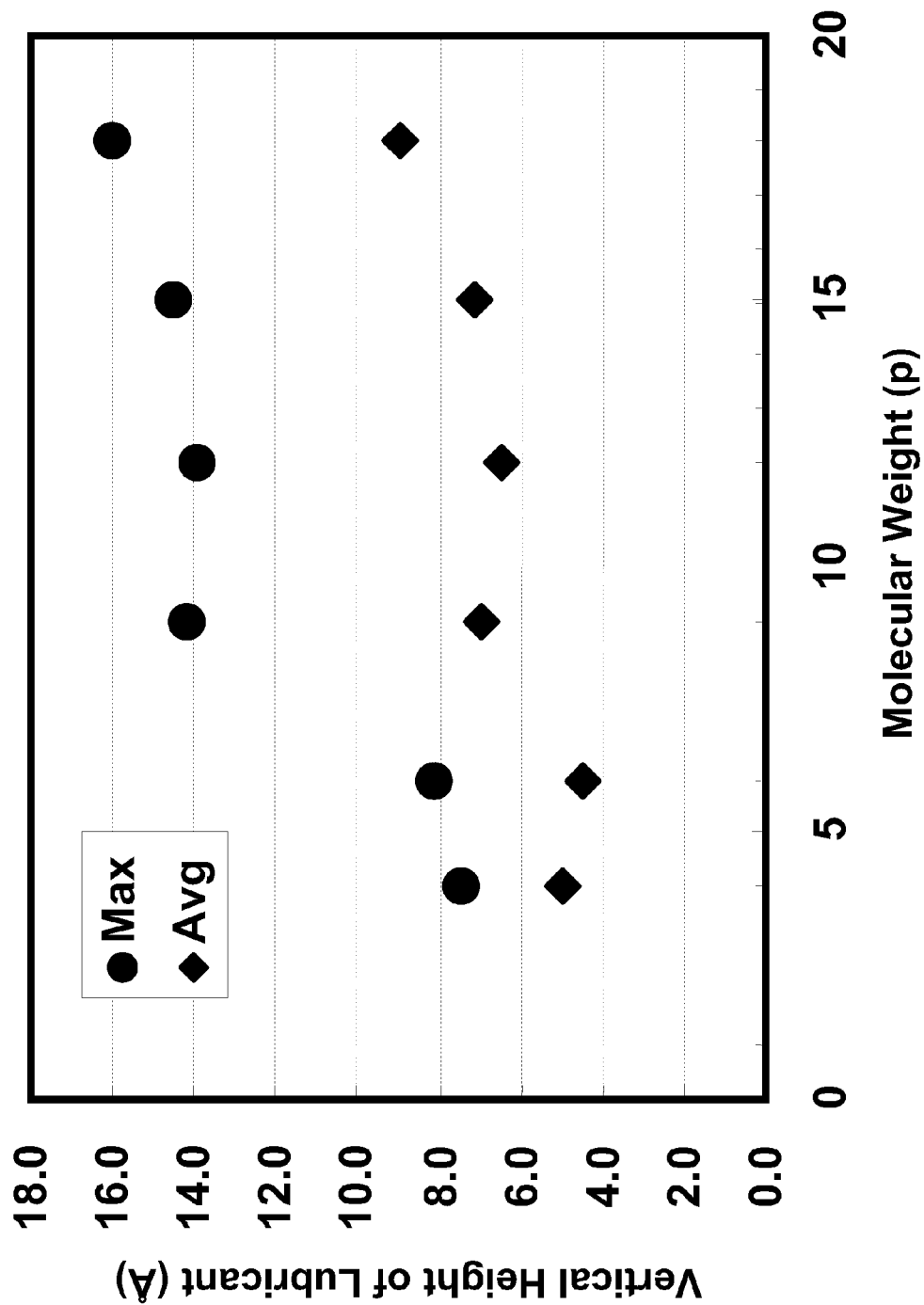
FIG. 6 shows measurements of molecule height against molecular weight for various lubricants.

In Chemical Formula 4, X is a terminal group. It was found that a stabilizing form (not easily removed through wear, transfer, etc.) is produced when a lubricant represented by Chemical Formula 4 is mounted on top of protective film. FIG. 6 shows measurements of molecule height against molecular weight. In the case of a lubricant of Chemical Formula 4, the maximum height reaches about 14 Å when p representing the molecular weight is 9. Therefore, a molecular weight of about 8 or lower for n and m in Chemical Formulae 2 and 3 may be preferable in some instances for narrowing clearance.

Figure 7:
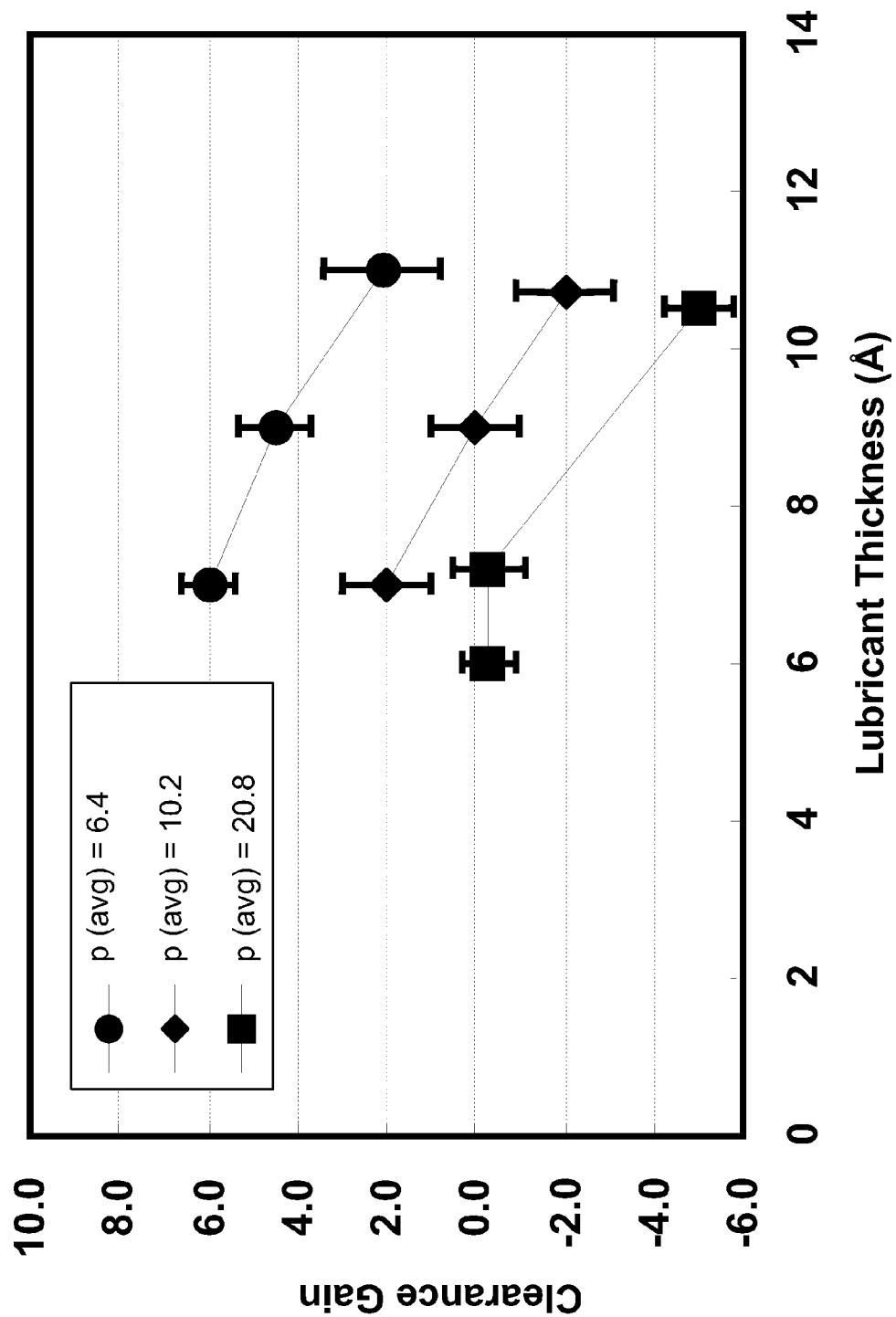
FIG. 7 shows empirical measurements of film thickness and touchdown power of lubricants having various molecular weights.

FIG. 7 shows empirical measurements of the film thickness and touchdown power of lubricants of Chemical Formula 4 having different values of p; that is, molecular weight. "TDP" is the power required to charge the heater housed in the magnetic head and thermally expand the head element portion until the head contacts the medium. Contact with the medium is detected from a rise in the output of an acoustic emission (AE) sensor placed near the magnetic slider suspension. The difference between clearance in a conventional magnetic disk system and clearance in magnetic disk system according to embodiments described herein was taken to be the clearance gain. The plus side indicates better clearance, and the minus side indicates worse clearance in arbitrary units. Although the thinner the lubricant film, the greater the gain, the greatest gain was found with lubricants in which the value of p was 8 or lower. Even when a lubricant of Chemical Formula 5 having a thin film thickness is used, wear of the media-facing surface (e.g., ABS) either cannot be prevented or becomes even heavier.

Lubricants of Chemical Formula 5 in which p=10.2 (on average) were used as comparative examples. An example with a film thickness of 11 Å was called "Ref. 1," and an example with a film thickness of 7 Å was called "Ref. 2." A lubricant of Chemical Formula 1 in which a=6, n=6.5 (average), and x=0 was used as a comparative example called "Ref. 3."

Figure 8:
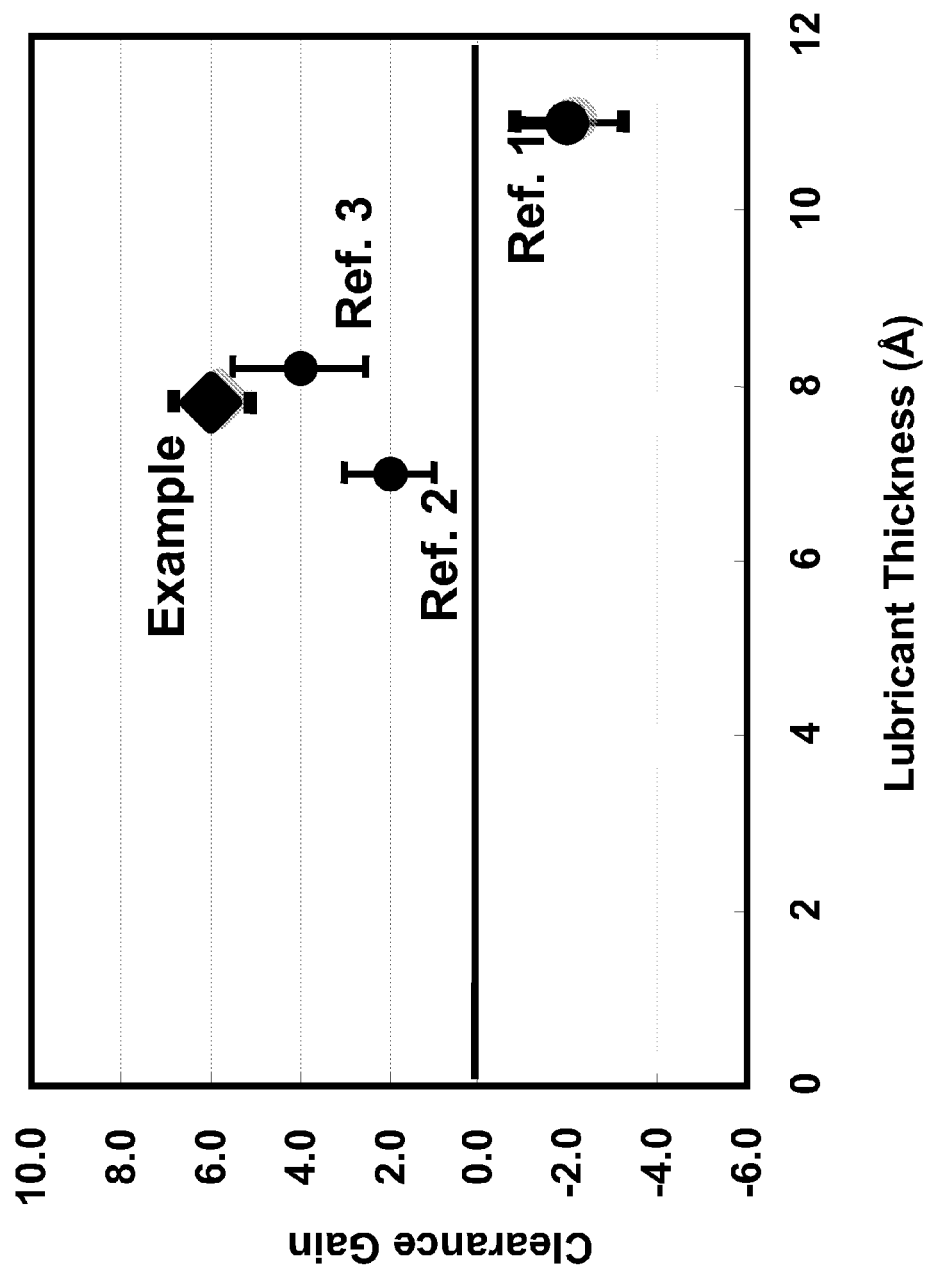
FIG. 8 shows clearance gain for a magnetic recording system using a magnetic medium according to one embodiment.

Together with these comparative examples, FIG. 8 shows clearance gain for the "Example," which is a working example according to one embodiment, revealing that this working example has greater gain than any of the comparative examples.

As in the measurement described previously, the heater housed in the magnetic head was charged to thermally expand the head element portion until the head contacted the medium. Upon detecting the magnetic head contacting the magnetic disk, power was immediately shut off to return the head to its original floating posture. This contact detection operation was repeated 1000 times. The state of transfer of lubricant to the magnetic head was observed after the magnetic head had contacted the magnetic disk. Being a fluorine type, the lubricant had no hydrocarbon oil mixed in. Using this property, a colored hydrocarbon oil was dropped onto the ABS surface of the magnetic head, which produced a contrast which was observable. The lubricant had transferred to around the magnetic head element. The amount transferred in the "Example," which is a working example, and the comparative examples "Ref. 2" and "Ref. 3" was very little, while the amount of lubricant transferred for "Ref. 1" was more significant.

Observing the ABS of the magnetic head by scanning electron microscopy (SEM) after similar repeated contact 1000 times revealed an amount of wear for each magnetic head. Whereas the "Example" which is a working example, and "Ref. 1" showed little wear, the comparative examples "Ref. 2" and "Ref. 3" showed heavy wear.

Furthermore, although the ABS of the magnetic head showed little wear for "Ref. 1," there was some loss of clearance and significant transfer of lubricant. "Ref. 2" had some clearance gain and little transfer of lubricant, but heavy wear. "Ref. 3" also had clearance gain and little transfer of lubricant, but heavy wear. These examples satisfied all of the conditions but are not feasible candidates for lubricants which improve magnetic recording density.

These results reveal that the "Example," which is a working example, may ensure clearance gain by having a structure determined by calculating the bulk height of the molecule, minimize transfer of the lubricant by strongly adsorbing a PFPE portion having polarity on the chain terminal to the protective film on the magnetic disk, and contribute to minimizing wear of the ABS of the magnetic head by having a PFPE portion lacking polarity on the terminal.

Now referring to FIG. 9, a method 900 for forming a magnetic medium is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. Any suitable formation technique may be used for any of the layers described in FIG. 9, including those specifically described herein and others known in the art, such as sputtering, plating, etc. Furthermore, any suitable material may be used for any of the layers described in FIG. 9, including those specifically described herein and others known in the art, such as magnetic materials, non-magnetic materials, insulating materials, etc.

In operation 902, a magnetic recording layer is formed above a non-magnetic substrate. The non-magnetic substrate may comprise a glass substrate. The magnetic recording layer may be formed using any material, technique, and to any thickness as would be known to one of skill in the art.

In operation 904, a protective overcoat is formed above the magnetic recording layer. The protective overcoat, in one approach, may comprise carbon, such as diamond-like carbon (DLC), etc.

However, in other approaches, the protective overcoat may be formed using any material, technique, and to any thickness as would be known to one of skill in the art.

In operation 906, a lubricant film is formed above the protective overcoat. The lubricant may be coated, applied, deposited, etc., using any technique known in the art which provides a substantially uniform dispersal of the lubricant across the upper surface of the protective overcoat.

In one embodiment, the lubricant film comprises a cyclophosphazene according to Chemical Formula 1, above. In this embodiment, each terminal functional group (Rf) of the cyclophosphazene may be selected from a group that includes: a first perfluoropolyether, Rf(A), according to Chemical Formula 2, above, and a second perfluoropolyether, Rf(B), according to Chemical Formula 3, above. Of course, other functional terminal groups may be used, as would be known to one of skill in the art, such as a hydroxyl group (—OH) and others known in the art which may be used to provide additional functionality to the lubricant.

In further approaches, n and m (which are parameters indicating an average number of repeating chains of ($CF_2CF_2CF_2O$) in each of Chemical Formula 2 and Chemical Formula 3, above) may be less than about 9 to provide lower molecular profiles, such as being in a range from about 4 to about 8.

In another approach, one or more of the terminal functional groups (Rf) of the cyclophosphazene may be Rf(B) to provide wear protection, while x may be in a range from 0 to about 2.

In a further approach, x may be 0 or 1. In another approach, between about 2 and about 5 of the terminal functional groups (Rf) of the cyclophosphazene may be Rf(A) or a derivative thereof.

In another approach, no more than about 2 of the terminal functional groups (Rf) of the cyclophosphazene may be Rf(A) to provide improved bonding to the protective overcoat.

The lubricants disclosed herein may be used in other environments than those listed herein.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:
1. A lubricant, comprising:
a cyclophosphazene according to chemical formula 1,

Chemical Formula 1

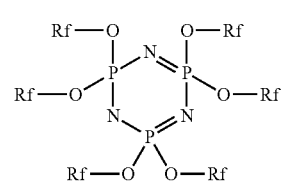

wherein each terminal functional group (Rf) of the cyclophosphazene is selected from a group consisting of: a first perfluoropolyether, Rf(A), according to chemical formula 2 and a second perfluoropolyether, Rf(B), according to chemical formula 3,

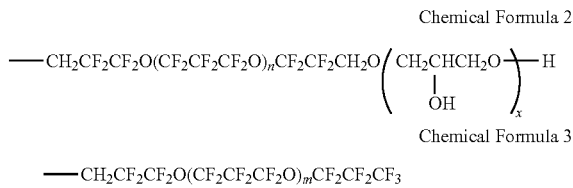

Chemical Formula 2

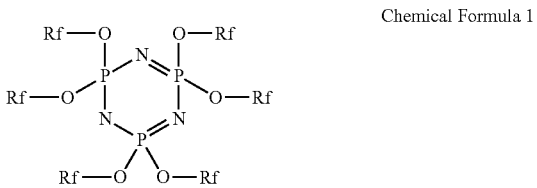

Chemical Formula 1 wherein each terminal functional group (Rf) of the cyclophosphazene is selected from a group consisting of: a first perfluoropolyether, Rf(A), according to chemical formula 2 and a second perfluoropolyether, Rf(B), according to chemical formula 3,

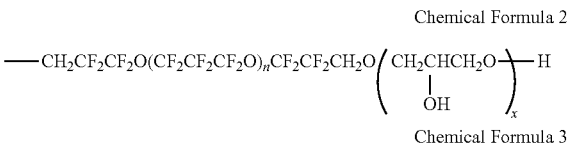

Chemical Formula 2

Chemical Formula 3 wherein n and m are parameters indicating an average number of repeating chains of $(CF_2CF_2CF_2O)$, wherein one or more of the terminal functional groups (Rf) of the cyclophosphazene are Rf(B) to provide wear protection, wherein one or more of the terminal functional groups (Rf) of the cyclophosphazene are Rf(A), and wherein x is 2.

2. The lubricant as recited in claim 1, wherein between about 2 and about 5 of the terminal functional groups (Rf) of the cyclophosphazene are Rf(A).

3. The lubricant as recited in claim 1, wherein no more than about 2 of the terminal functional groups (Rf) of the cyclophosphazene are Rf(A) to provide bonding to a protective overcoat.

4. The lubricant as recited in claim 1, wherein n and m are in a range from about 4 to about 8.

5. The lubricant as recited in claim 1, wherein n and m are less than 9 to provide lower molecular profiles.

6. A magnetic medium, comprising:
a magnetic recording layer positioned above a non-magnetic substrate;
a protective overcoat positioned above the magnetic recording layer; and
the lubricant as recited in claim 1 positioned above the protective overcoat.

7. The magnetic medium as recited in claim 6, further comprising:
an adhesion layer positioned above the non-magnetic substrate;
a soft underlayer positioned above the adhesion layer; and
an underlayer positioned above the soft underlayer and below the magnetic recording layer,
wherein the protective overcoat comprises carbon, and
wherein the non-magnetic substrate comprises a glass substrate.

8. A magnetic data storage system, comprising:
at least one magnetic head;
the magnetic medium as recited in claim 6;
a drive mechanism for passing the magnetic medium over the at least one magnetic head; and
a controller electrically coupled to the at least one magnetic head for controlling operation of the at least one magnetic head.

9. A method for forming a magnetic medium, the method comprising:
forming a magnetic recording layer above a non-magnetic substrate;
forming a protective overcoat above the magnetic recording layer; and
forming a lubricant film above the protective overcoat,
wherein the lubricant film comprises a cyclophosphazene according to chemical formula 1, wherein n and m are parameters indicating an average number of repeating chains of $(CF_2CF_2CF_2O)$, wherein one or more of the terminal functional groups (Rf) of the cyclophosphazene are Rf(B) to provide wear protection, wherein one or more of the terminal functional groups (Rf) of the cyclophosphazene are Rf(A), and wherein x is 2.

10. The method as recited in claim 9, wherein between about 2 and about 5 of the terminal functional groups (Rf) of the cyclophosphazene are Rf(A).

11. The method as recited in claim 9, wherein no more than about 2 of the terminal functional groups (Rf) of the cyclophosphazene are Rf(A) to provide bonding to the protective overcoat.

12. The method as recited in claim 9, wherein n and m are in a range from about 4 to about 8.

13. The method as recited in claim 9, wherein n and m are less than 9 to provide lower molecular profiles.

14. A magnetic medium, comprising:
a magnetic recording layer; and
a lubricant film positioned above the magnetic recording layer,
wherein the lubricant film comprises a cyclophosphazene according to chemical formula 1,

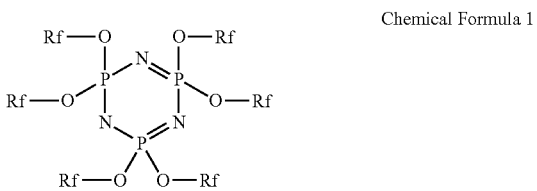

Chemical Formula 1 wherein each terminal functional group (Rf) of the cyclophosphazene is selected from a group consisting of: a first perfluoropolyether, Rf(A), according to chemical formula 2 and a second perfluoropolyether, Rf(B), according to chemical formula 3, Chemical Formula 2

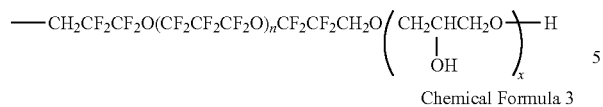

Chemical Formula 3

wherein n and m are parameters indicating an average number of repeating chains of $(CF_2CF_2CF_2O)$ and are in a range from about 4 to about 8, wherein one or more of the terminal functional groups (Rf) of the cyclophosphazene are Rf(B) to provide wear protection, wherein one or more of the terminal functional groups (Rf) of the cyclophosphazene are Rf(A), and wherein x is 2.

15. The magnetic medium as recited in claim 14, wherein about two, on average, of the terminal functional groups (Rf) of the cyclophosphazene are Rf(A).

* * * * *